UNITED STATES PATENT OFFICE.

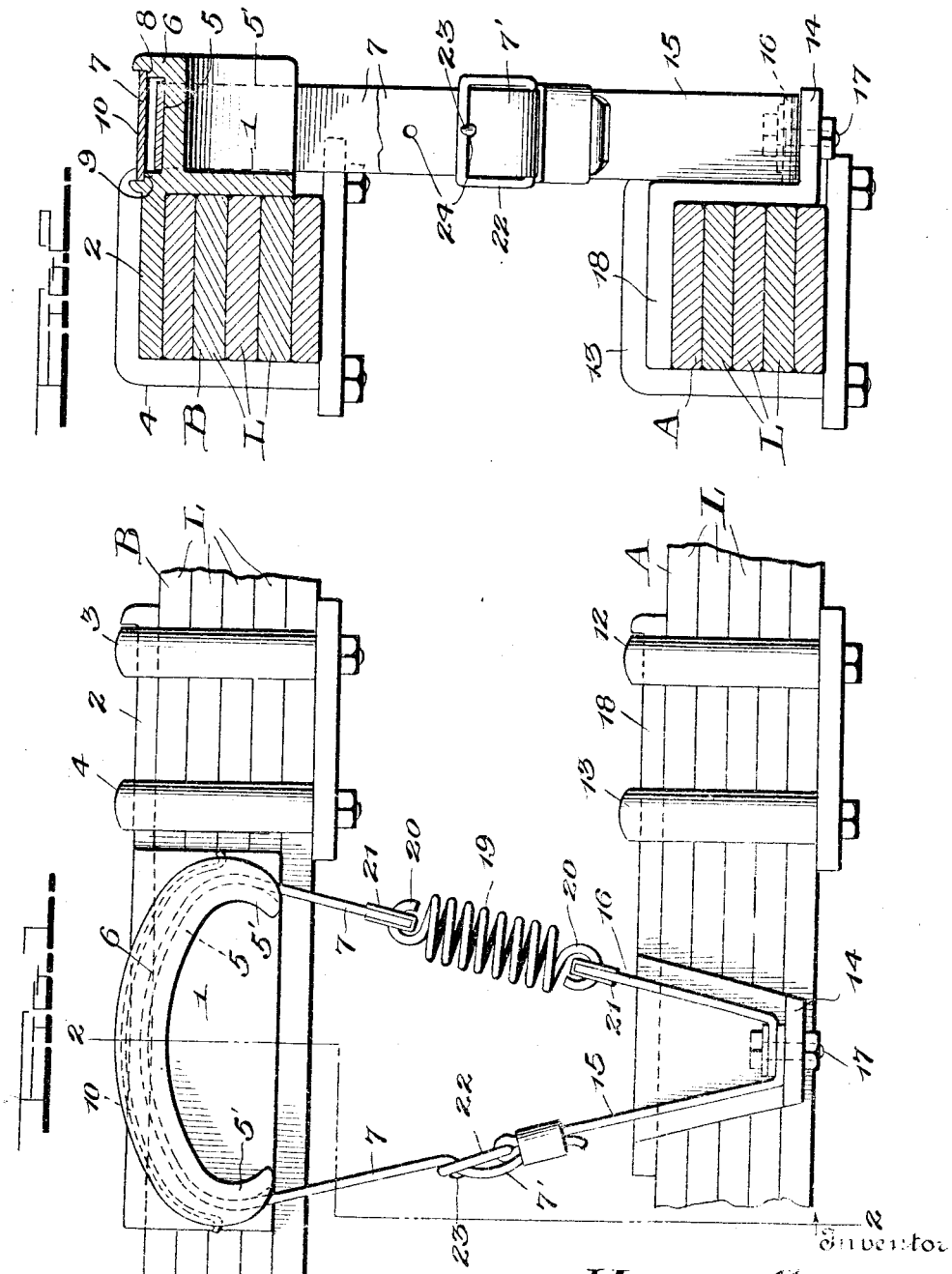

HARRY CROSS, OF WOODSTOCK, ILLINOIS.

SHOCK-ABSORBER.

1,182,253.  Specification of Letters Patent.  Patented May 9, 1916.

Application filed June 17, 1915. Serial No. 34,698.

*To all whom it may concern:*

Be it known that I, HARRY CROSS, a citizen of the United States, residing at Woodstock, in the county of McHenry and State of Illinois, have invented certain new and useful Improvements in Shock-Absorbers; and I do declare the following to be a full, clear, and exact description of the invention, such as will enable others skilled in the art to which it appertains to make and use the same.

This invention relates to shock absorbers for vehicles and more particularly to shock absorbing devices adapted to be used on motor vehicles.

The object of the invention is to provide a simply constructed shock absorber having means for controlling the movement or vibrations of the spring supported body of the vehicle relative to the running gear thereof, which device does not affect the action of the vehicle springs in compressing, but prevents the sudden reaction or rebound which very often causes broken springs and discomforts to the occupants of the vehicle.

With this object in view, the invention consists of certain novel features of construction, and the combination and arrangement of parts as will be more fully described and claimed.

In the accompanying drawings:—Figure 1 represents a side elevation of a portion of a vehicle spring showing this improved shock absorber applied; Fig. 2 represents a transverse section taken on the line 2—2 of Fig. 1.

In the embodiment illustrated, a portion of a vehicle spring is shown which is composed of a plurality of superposed leaves or layers L as is usual with springs of this character.

The shock absorber device embodying the present invention is shown interposed between the members of this spring, but it may be interposed between the body and any other stationarily supported part of the running gear. This shock absorbing device comprises an attaching plate or bracket 1 adapted to be disposed flat against the upper member B of the spring. This plate is here shown substantially rectangular in form and having an arm 2 extending laterally from the upper edge thereof. One end of the arm 2 extends beyond the end of the plate 1 and is secured to the upper member B of the spring by clips 3 and 4. From this bracket 1 laterally projects a braking element 5 here shown in the form of a heavy oblong bar having its ends 5' curved downwardly and inwardly. This bar 5 is provided on its outer edge with a laterally extending or upturned flange 6 between which and the plate 1 a brake band 7 is designed to be mounted, said band being slightly less in width than the distance between said flange 6 and plate 1 as is shown clearly in Fig. 2. The flange 6 is provided on its inner face near its edge with a shoulder 8 and a similar shoulder 9 is formed on the plate 1 to support a retaining plate or guard 10 between which and the lower face of the member 5 is formed the brake band receiving chamber and which assists in protecting the band and preventing it from accidentally rising out of its seat. As shown this guard 10 has its ends bent outwardly to facilitate its application and removal and it is of a width to cause it to fit snugly on the shoulders 8 and 9 and to be held in operative position by friction or otherwise as may be desired or found necessary.

Embracing the other member A of the spring are two clips 12 and 13 which are designed to secure to said member a brake band connecting bracket here shown in the form of a socket 14 forming a seat to receive the overlapped ends of two straps 15 and 16 through which a bolt 17 extends and secures said straps to said bracket. An arm 18 projects laterally from the socket 14 and extends between clips 12 and 13 and the spring member A by means of which the bracket is secured to said spring member.

An elastic tension device, here shown in the form of a coiled spring 19 has its lower end secured to the strap 16 and the opposite end of this spring is engaged with one end of the brake band 7 being here shown provided with a hook 20 which passes through an aperture in the end of the brake band, said apertured end of the brake band being preferably reinforced by a binding strip 21 here shown U-shaped in cross section and between the legs of which the end of said brake band is mounted. (See Fig. 1.) This brake band 7 passes around the oblong friction element 5 within the aforesaid chamber and the free end 7' thereof is detachably and adjustably connected with the free end of the strap 15; the latter being connected at its other end with the socket 14. To effect this connection this brake band end 7' is shown connected with said strap end by means of a buckle 22, the tongue 23 of which is designed to be passed through one of a series of apertures 24 formed in the end of the brake band and spaced longitudinally to provide for the adjustable connection of said band with said strap. This brake band 7 may be composed of any suitable non-stretching material preferably of camel's hair. The dimensions of the belt and spring 19 are such that the spring 19 is held extended when the main springs of the vehicle are in their normal positions and the spring returns to its normal form when the main springs of the vehicle are compressed.

When a wheel of the vehicle to which this device is applied strikes an obstruction in the road, the springs which support the body of the vehicle are compressed and the members B and A thereof are then brought closely together. When this occurs the spring 19 will return to its normal position and the band 7 will slip freely around the surface of the friction member 5. On the immediate rebound of the vehicle supporting springs, the band 7 and its spring 19 secured thereto will cause a braking action on the friction element 5 preventing thereby the sudden upward throw of the vehicle body, or in other words, the friction of the belt on the braking surface 5 as the vehicle springs return to their normal position, prevents the quick rebound and throwing up of the body of the vehicle which is so objectionable to the passengers and fatal in many instances to the springs. It is obvious that the device does not interfere with the easy action of the vehicle springs in compressing, but prevents the reaction or rebound thereof.

Should for any reason it be desired to increase or decrease the braking action of the band, all that is necessary is to adjust the end 7' of the band 7 in relation to the buckle 22 whereby the band will be lengthened or shortened according to the braking action desired.

I claim as my invention:—

1. An attachment of the class described comprising an oblong friction element provided with means for attachment to one of the members of a vehicle spring, a flange extending laterally from the outer edge of said element, a guard carried by said element to form a brake band receiving chamber in conjunction therewith, a brake band arranged in said chamber and passing around said element, a pair of straps having means for attachment to the other member of said vehicle spring, the free end of one of said straps being adjustably connected to one end of said band, and a coiled spring connecting the other end of said band with the free end of the other strap.

2. An attachment of the class described comprising a rectangular plate adapted to be disposed flat against the side edge of the upper member of a vehicle spring, an arm extending laterally from the upper edge of said plate and having one of its ends extending beyond the end of the latter, clips to attach the herein mentioned end of said arm to the upper member of said vehicle spring, an oblong bar projecting laterally from said plate and having its ends curved downwardly and inwardly, an upturned flange at the outer edge of said bar, alined shoulders arranged on the adjacent sides of said flange and said plate, a retaining plate supported upon said shoulders and clamped between said flange and said plate, and a brake band passing around said bar and provided with means at one of its ends for adjustable connection to the lower member of said vehicle spring, the other end of said band being provided with elastic tension means for connection to the latter.

In testimony whereof I have hereunto set my hand in presence of two subscribing witnesses.

HARRY CROSS.

Witnesses:
 Thos. B. Owens,
 Albert G. Wicks.